US010733914B2

(12) United States Patent
Kruchko

(10) Patent No.: US 10,733,914 B2
(45) Date of Patent: Aug. 4, 2020

(54) SYSTEMS AND METHODS FOR LABELING

(71) Applicant: Steven N. Kruchko, Western Springs, IL (US)

(72) Inventor: Steven N. Kruchko, Western Springs, IL (US)

(*) Notice: Subject to any disclaimer, the term of this patent is extended or adjusted under 35 U.S.C. 154(b) by 421 days.

(21) Appl. No.: 15/282,744

(22) Filed: Sep. 30, 2016

(65) Prior Publication Data

US 2017/0092160 A1 Mar. 30, 2017

Related U.S. Application Data

(60) Provisional application No. 62/235,402, filed on Sep. 30, 2015.

(51) Int. Cl.

| | |
|---|---|
| ***G09F 3/10*** | (2006.01) |
| ***B32B 7/12*** | (2006.01) |
| ***B32B 3/04*** | (2006.01) |
| ***C09D 123/06*** | (2006.01) |
| ***B32B 27/06*** | (2006.01) |
| ***B32B 3/10*** | (2006.01) |
| ***B32B 27/16*** | (2006.01) |
| ***B32B 29/00*** | (2006.01) |
| ***B32B 7/06*** | (2019.01) |
| ***B32B 7/14*** | (2006.01) |
| ***B32B 27/08*** | (2006.01) |
| ***B32B 27/10*** | (2006.01) |
| ***B32B 27/36*** | (2006.01) |
| ***B32B 3/26*** | (2006.01) |
| *G09F 3/02* | (2006.01) |

(52) U.S. Cl.

CPC .................. *G09F 3/10* (2013.01); *B32B 3/04* (2013.01); *B32B 3/10* (2013.01); *B32B 3/266* (2013.01); *B32B 7/06* (2013.01); *B32B 7/12* (2013.01); *B32B 7/14* (2013.01); *B32B 27/06* (2013.01); *B32B 27/08* (2013.01); *B32B 27/10* (2013.01); *B32B 27/16* (2013.01); *B32B 27/36* (2013.01); *B32B 29/002* (2013.01); *C09D 123/06* (2013.01); *B32B 2255/10* (2013.01); *B32B 2255/12* (2013.01); *B32B 2255/26* (2013.01); *B32B 2307/748* (2013.01); *B32B 2307/75* (2013.01); *B32B 2519/00* (2013.01); *B32B 2605/00* (2013.01); *G09F 2003/0201* (2013.01); *G09F 2003/0222* (2013.01); *G09F 2003/0229* (2013.01); *G09F 2003/0233* (2013.01); *G09F 2003/0248* (2013.01)

(58) Field of Classification Search

CPC ............................................... G09F 2003/0222

See application file for complete search history.

(56) References Cited

U.S. PATENT DOCUMENTS

| | | | | |
|---|---|---|---|---|
| 3,741,786 | A * | 6/1973 | Torrey | C09J 7/20 428/41.9 |
| H000509 | H * | 8/1988 | Chao | 526/264 |
| 4,771,891 | A * | 9/1988 | Sorensen | B65D 5/708 156/291 |
| 5,413,383 | A * | 5/1995 | Laurash | B42D 15/006 229/300 |
| 6,491,995 | B1 * | 12/2002 | Schreiner | G09F 3/10 283/101 |
| 6,632,316 | B1 | 10/2003 | Garvic | |
| 6,830,795 | B1 | 12/2004 | Downs | |
| 6,926,942 | B2 | 8/2005 | Garvic et al. | |
| 7,709,071 | B2 | 5/2010 | Wong et al. | |
| 8,020,765 | B2 | 9/2011 | Nunez et al. | |
| 8,261,477 | B1 | 9/2012 | Wilkinson et al. | |
| 8,445,104 | B2 | 5/2013 | Vigunas et al. | |
| 2002/0142156 | A1 * | 10/2002 | Maloney | C09J 7/20 428/343 |
| 2002/0148751 | A1 * | 10/2002 | Pedroli | B65D 23/14 206/461 |
| 2006/0057325 | A1 * | 3/2006 | Hodsdon | G09F 3/0286 428/40.1 |
| 2006/0107576 | A1 * | 5/2006 | Hirst | G09F 3/10 40/638 |
| 2006/0257607 | A1 | 11/2006 | Crooks et al. | |
| 2007/0020423 | A1 | 1/2007 | Chamandy et al. | |
| 2012/0258271 | A1 | 10/2012 | Maughan | |
| 2013/0192111 | A1 | 8/2013 | Kennedy | |

* cited by examiner

*Primary Examiner* — Anish P Desai

(74) *Attorney, Agent, or Firm* — Cook Alex, Ltd; Ryan Truesdale

(57) ABSTRACT

A pattern-adhesive label-sheet comprises at least one label made of a face stock and a release liner. The label includes a label head with a first adhesive applied in a first pattern, a label body with a second adhesive applied in a second pattern, and a label tab. In some embodiments, at least part of the label tab overhangs the release liner. In some embodiments, a silicone coating can be applied to the label body and/or release liner.

15 Claims, 14 Drawing Sheets

SYSTEMS AND METHODS FOR LABELING

CROSS-REFERENCE TO RELATED APPLICATIONS

This application claims priority benefits from U.S. Provisional Patent Application No. 62/235,402 filed Sep. 30, 2015 entitled "Systems and Methods for Labeling". The '402 application is hereby incorporated by reference in its entirety.

FIELD OF THE INVENTION

The present invention relates to systems and methods for labeling, and, in particular, adhesive labels and shelf edge labels.

Pressure-sensitive labels are commonly used on retail shelf edges to display price and product information. The shelf edge is typically only 1" (2.54 cm) or 2" (5.08 cm) wide which limits the amount of information a retailer can put on the shelf edge.

Retailers can overcome the limitation of the shelf edge width by applying a label that extends below the shelf edge providing a larger surface area on which to print product sales information.

A typical shelf edge label can have a 1" (2.54 cm) strip of pressure-sensitive adhesive along the top edge (or head) of the label and have no adhesive exposed on the remainder of the label. The adhesive can be designed to aggressively adhere to the shelf edge at the head of the label yet have a very light or nonexistent tack on the remainder of the label. The label can hang freely below the shelf edge without attaching to products or other objects as they are placed on, or removed from, the retail shelf.

One approach to shelf edge labeling is to use an overall adhesive with a deadening overprint. The die cut labels are usually supplied in a relatively large sheet (e.g. 8.5" (21.59 cm)×11" (27.94 cm)) and can be peeled off the sheet one at a time.

Another approach to shelf edge labeling is to use split release liner backed labels. A release liner is a sheet coated with a release agent that is used to prevent the sticky side of a label from adhering prematurely to another surface. The release liner can be made of paper or a plastic-based film, for example, and can be applied during manufacturing. The retailer typically receives multiple labels on a large sheet or a stack of individually cut labels. The back release liner is split so that a portion of the release liner can be removed, exposing the adhesive on the head of the label and leaving the release liner on the remainder of the label.

Yet another approach to labeling is to use double-sided tape. In this approach, a thin strip of double-sided tape is applied to the back of the label. The tape typically has a thin release liner which can be removed to expose the shelf edge adhesive.

The application of shelf edge labels can be labor intensive. Typically, a store employee walks the aisles and applies labels in an order determined by a store planogram. Retailers often change prices weekly and promote thousands of items at a given time. A large retailer with multiple stores will change hundreds or thousands of shelf edge labels each week. As such, any improvement that reduces the amount of time (even by as little as a second) that employees have to spend changing a given label can lead to significant cost savings.

One way to make the process of applying shelf labels more efficient is to reduce the amount of time it takes an employee to remove the label from the backing sheet/release liner. This application discloses, among other improvements, several ways to reduce the amount of time spent removing the labels from the release liner. One technique involves manufacturing labels with an edge/tab that overhangs the release liner. Another technique involves labels in which at least one edge has little, if no, tack and as such does not stick (or at least barely sticks) to the release liner. Similar to using an overhanging edge/tab, the edge with little to no tack can act as a popup tab that can be readily grabbed by an employee without the employee having to dig his or her fingernail between the label and release liner. Labels utilizing overhang/popup tabs can require less labor to apply then conventional shelf labels. Overhang/popup tabs labels can save over three seconds per label in labor compared to traditional labels. For retail chains with thousands of stores with thousands of label changes each week, the time savings of using popup tab labels can be in the millions of hours per year.

SUMMARY OF THE INVENTION

A pattern-adhesive label-sheet can include at least one label made of a face stock wherein the label has a label head with a first adhesive applied in a first pattern, a label body, and a label tab. In some embodiments, a second adhesive is applied in a second pattern. The pattern-adhesive label-sheet can also include a release liner, wherein at least part of the label tab can overhang the release liner. In some embodiments, the label tab does not overhang the release liner. It should be noted that in many embodiments the first adhesive and second adhesive are made of the same material. In some embodiments, the second adhesive is applied to the release liner and engages with the label body. In other or the same embodiments, the second adhesive can be applied to the label body. In some of these embodiments, the second adhesive is applied in a pattern.

In some embodiments, the first and/or second adhesive is/are configured to work in temperatures between −30 degrees Celsius to 40 degrees Celsius. In some embodiments, the first and/or second adhesive is/are configured to work in humid conditions.

The first and/or second adhesive can be an acrylic microsphere adhesive, hot melt adhesive, and/or UV adhesive. In some embodiments, the first adhesive is a high-tack adhesive and the second adhesive is a low-tack adhesive. In some embodiments, the first adhesive and the second adhesive cover less than 20% of the label.

In at least one embodiment the label-sheet is part of a roll. In some embodiments, the roll is fan-folded.

In some embodiments, the first and/or second pattern is a series of dots. In other or the same embodiments, the first and/or second pattern is a series of dashes. In other or the same embodiments, the first and/or second pattern is a series of thin lines the run across essentially the entire width of the label body.

In some embodiments, the release liner is paper. In other embodiments, the release liner is a synthetic material. In some embodiments, the release liner is coated with a silicone-coating. In some embodiments, the label body and label tab are coated with a silicone-coating.

In some embodiments, the face stock is paper. In other embodiments, the face stock is a synthetic material.

In certain embodiments, the label sheet is configured to be used with a direct thermal printer. In other or the same embodiments, the first pattern and the second pattern are configured in such a way that the first adhesive and the second adhesive do not ooze when the label-sheet is printed on.

DETAILED DESCRIPTION OF ILLUSTRATIVE EMBODIMENT(S)

Figure 1:
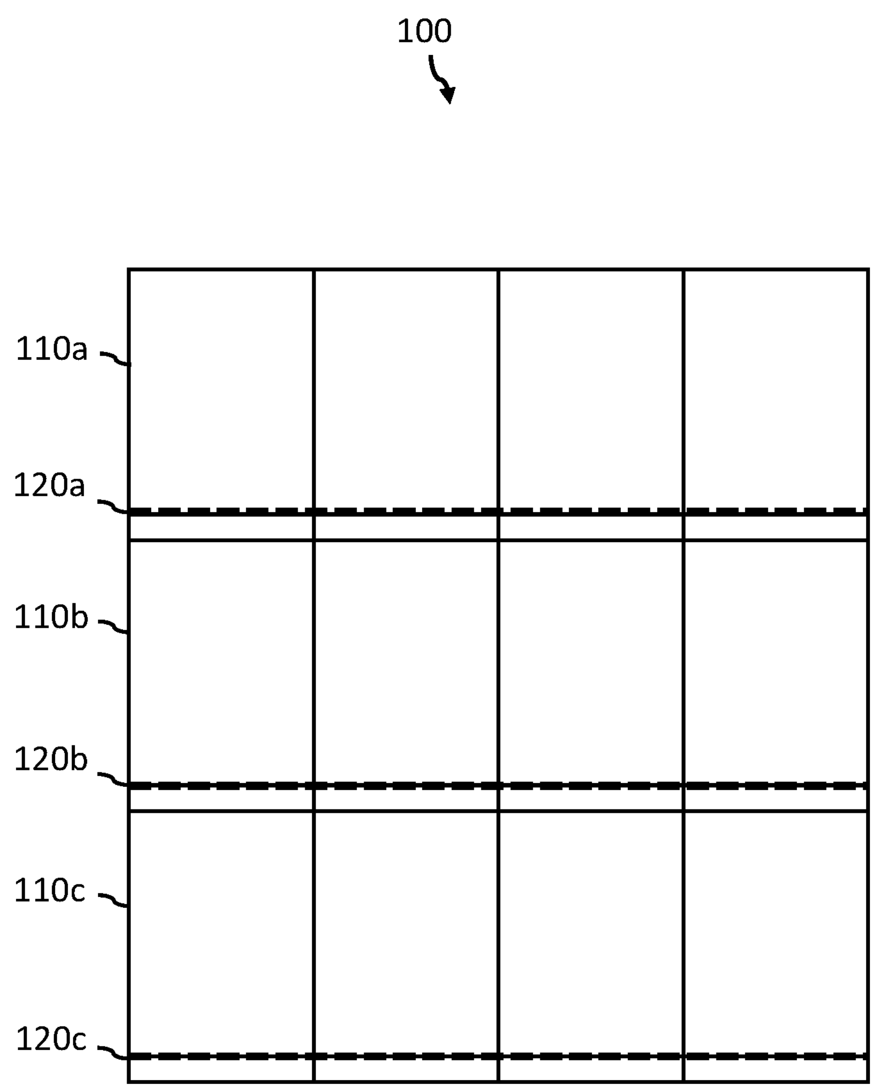
FIG. 1 is a plan view of a label sheet according to one illustrated embodiment.

A patterned adhesive shelf edge label with an overlapping free edge and/or popup tab can reduce installation time, use less raw material and eliminate, or at least reduce, costly steps in manufacturing.

In some embodiments, the patterned adhesive shelf edge label has a label face stock that extends beyond the edge of the release liner, thereby providing an edge or tab that can be easily grasped, making it easier for the label to be removed from the release liner. A benefit of this aspect of the shelf edge label is that it can significantly reduce the time taken to manually apply labels to shelf edges. In some embodiments, the label tab overhangs a perforation, which can be folded or separated to create an edge of the release liner.

In some embodiments, the label has a tab with minimum, if any, adhesive properties. This can be accomplished either by not applying adhesive to the tab in the first place or by removing and/or nullifying the adhesive properties of the tab. In some embodiments, the adhesive properties are nullified with a deadening agent. This tab can act as a popup tab and can significantly reduce the time taken to manually apply labels to shelf edges.

In some embodiments, an advantage of a pattern-adhesive label-sheet is that the label can be manufactured with minimal to no use of deadening agents. In some of these embodiments, a patterned adhesive is applied to the release liner and/or the label head. In some embodiments, a patterned silicone coat can be used in conjunction with the patterned adhesive.

Another aspect of the shelf edge label described herein is that adhesive can be applied to each label in a pattern. The pattern can be configured such that the top edge of the label (or label head) can be aggressively applied to a shelf edge while the remainder of the label can hang down below the shelf edge. The portion of the label hanging below the shelf edge can have a limited amount of adhesive, sufficient to adhere the label to the release liner while not enough to cause the adhesive to grab onto items removed from the shelf.

A benefit of patterning the adhesive is that the pattern can use less adhesive than a conventional full-coverage adhesive label approximately. In some embodiments, the pattern uses approximately 80% less adhesive than a conventional full-coverage adhesive label. In some embodiments, the pattern uses between 40%-90% less adhesive. This reduces manufacturing costs.

Another problem with conventional adhesive labels is that they can be difficult to run on printers because adhesive can ooze out along the edge of the labels and gum up the mechanism in the printer. Conventional label sheets typically have the perimeter of the sheets' face stock removed. This is so the adhesive does not ooze out when laser or direct thermal printing the label. A benefit of patterning is that a pattern can be defined in which the adhesive is not applied to the edge of the label, thereby eliminating, or at least reducing, the risk of adhesive ooze.

Another problem with conventional full-coverage adhesive shelf edge labels is that they often require additional materials and manufacturing steps to deaden the adhesive on the portion of the label hanging down below the shelf edge. The additional manufacturing steps can include separating the release liner from the adhesive, printing a deadening coat over the adhesive, and marrying the release liner back onto the deadened adhesive layer.

It should be noted that patterned deadening is also in the scope of this disclosure. Patterned deadening can be used to create areas with various degrees of tack. In some embodiments, different deadening agents are used to create the various degrees of tack. In other or the same embodiments, different concentrations of the same deadening agent are used to create the various degrees of tack. In one embodiment a patterned deadening technique is used to create a popup tab.

Conventional shelf edge labels are typically provided in full sheets, or in sheets cut down to individual size. Conventional shelf edge labels are unsuitable for providing in rolls because the label cannot be grasped from the bottom edge. The label can only be removed from the side which has the effect of greatly increasing the handling time by the retailers.

Using the technology described in this disclosure, the labels can be supplied in rolls. An advantage of label rolls is that the order of the labels is not mixed when handled by the retailers, thereby eliminating, or at least reducing, the risk of errors. With sheets of labels or individually cut labels, the order of labels (often printed per planogram) can be mixed inadvertently when handling.

While conventional shelf edge labels are typically printed by the retailer at the store on laser printers, rolls of labels can be printed by the retailer at the store on a direct thermal printer. Direct thermal printers typically have no consumables other than the label stock, can run with less supervision, and are less expensive and more reliable.

Furthermore, rolls of labels can be printed and supplied fan-folded. An advantage of fan-folding is that the labels can be separated into sections by tearing the fan fold along a perforation. The order of the planogram can be maintained while the labels can be separated into different departments, for example.

Shelf edge adhesives should be removable and repositionable, and the adhesives should not leave much, if any, residue behind when removed from the shelf edge. In certain embodiments, such as grocery stores, the label might be installed at room temperature or in a refrigerator/freezer case. As such, at least in certain embodiments, the adhesive can withstand freezing temperatures and/or high moisture content.

Acrylic microsphere adhesives are commonly used in removable applications. The microspheres prevent, or at least reduce the chance of, the full surface of the adhesive from adhering to the application surface. In this way an aggressive tack adhesive with good cohesive strength can still be removed and leave little to no residue behind Water based acrylic microsphere adhesives are often applied with roll, flexographic, slot die, silkscreen or gravure coaters onto a release liner. The release liner can be passed through an oven, leaving behind a solid adhesive-coated release liner. The face stock can be laminated onto the adhesive completing the three-layer construction of a pressure-sensitive label. The three layers are the release liner, the adhesive, and the face stock. In some pattern-coated applications, the adhesive is selectively placed on the release liner. Alternative adhesives include UV adhesives, hot melt adhesive and other suitable adhesives.

The pattern of the adhesive can be selected based, at least in part, on the size of the label and the layout of the printed sheet. It is generally desirable for the top edge of the shelf edge label (the label head) to adhere to the shelf edge, and the remainder of the label to hang freely below the shelf edge.

In one embodiment, adhesive can be pattern-coated in a solid, narrow strip along the head of the label, for example in a strip approximately 0.5" (1.27 cm) to 2" (5.08 cm) wide. The remainder of the label can be pattern-coated with a low-tack adhesive.

In some embodiments, a patterned silicone coating can be applied to the label and/or the release liner. This patterned silicone coating is often found on the label in embodiments where the release liner comprises a patterned adhesive.

One advantage of pattern-coating the remainder of the label or pattern-coating a corresponding space on the release liner is to hold the label onto the release liner so that the label can be further processed without having the body or tab of the label peel up during the printing and finishing operations. Common patterns for the low-tack adhesives on the release liner or the label include, but are not limited to, dots, dashes, and thin lines. The adhesive strength of the pattern is proportional to the surface area of the adhesive applied in the pattern. For example, an adhesive strip 2" (5.08 cm)×0.5" (1.27 cm) can have a peel strength of around 55 grains, whereas the same adhesive arranged in a pattern 2" (5.08 cm)×0.1" (0.254 cm) can have a peel strength of around 5 grams.

In some embodiments, the release liner can also be pattern-coated in registration with the pattern of the adhesive. For example, it can be desirable to apply a low-release silicone coating behind the solid strip of adhesive at the head of the label, and a tight-release silicone coating beneath the low-tack portion of the label. In some embodiments, no release coating is present behind the low-tack portion of the label.

In some embodiments, the label can be pattern-coated in registration with the pattern of the adhesive. For example, it can be desirable to apply a tight-release silicone coating to the body or tab of the label which is in registration to a patterned adhesive on the release liner.

In some embodiments, a silicone release coating can be pattern applied to the release paper and/or the backside of the face stock. In some embodiments, it can be desirable to have little or no adhesive present on the portion of label hanging below the shelf. Applying a silicone release coating to a portion of the backside of the face stock prior to applying the adhesive layer aids in making sure that no, or at least very little, adhesive sticks to the portion of the label hanging below the shelf edge while still allowing the adhesive to stick to the uncoated paper liner. In some embodiments, wherein the release liner is patterned with adhesive and the label is not, the silicone coating of the label allows little or no adhesive to be present on the portion of the label hanging below the shelf.

It should also be noted that the pattern-adhesive technique can also be applied to linerless labels. In some embodiments, the pattern-adhesive techniques can be used to create popup tabs for the individual labels in a roll.

The label face stock used is often specified based on its intended use, such as the store environment. At room temperature, a paper face stock can be used, but, in moist conditions, synthetic stocks can be used to avoid, or at least reduce, curling of the stock. Face stock materials can include, but are not limited to, paper, board, latex-saturated paper, polypropylene, polyester, vinyl, and styrene.

In one example embodiment, the release liner can comprise 70 lb paper. Lighter or heavier paper release liners can be used along with synthetic liner material. The printing press can be a 5-color flexographic press with inner-station UV curing, and three-station die cutting.

FIG. 1 is a plan view of portion 100 of a label sheet according to an example illustrated embodiment. In the example shown, portion 100 comprises 12 individual labels 110 such as labels 110*a*, 110*b*, and 110*c*. In other embodiments, label sheet 100 can comprise a single label 110 or other suitable numbers of labels 110. In some embodiments, the label template for each label 110 on a label sheet is the same and is repeated across the label sheet. In the example illustrated in FIG. 1, labels 110*a*, 110*b*, and 110*c* follow a repeating template.

In one approach, a digital file can be created of a label with particular dimension such as 2" (5.08 cm)×3" (7.62 cm). The label can be repeated across a template for the label sheet, for example with dimensions of 13" (33.02 cm)×12" (30.48 cm). FIG. 1 illustrates a die cut pattern of the labels according to some embodiments.

A digital template can be created to position perforation cuts 120 (such as perforation cuts 120*a*, 120*b*, and 120*c*) on the reverse side of the release liner. These perforation cuts are generally in registration to the die cut pattern of the labels, and undercut the bottom edge of each label, for example by 0.125" (0.3175 cm). In some embodiments, a flexible steel rule die can be used to match the die cut template.

A digital adhesive pattern can be overlaid on the original die cut pattern. In an example embodiment (described below in reference to FIG. 2), the adhesive pattern template can comprise a 0.5-inch (1.27 cm) solid adhesive strip at the head of the label, along with four equally-spaced 0.063-inch (0.16002 cm) adhesive strips on the lower portion of the label.

In an example manufacturing approach for the label sheet illustrated in FIG. 1, a paper web of tight-release 70 lb release liner can be pattern adhesive coated on a hot melt slot die coater. The slot blade on the hot melt extrusion die can be cut to match the adhesive pattern template. Hot melt pressure-sensitive adhesives can be extruded through the pattern cut slot die, for example at a 0.75 mil coat weight.

The pattern-coated release liner can then be laminated to a corona treated white 2 mil polyester film. The laminated polyester/adhesive/release liner can then be slit down to a roll 13" (33.02 cm) wide. The roll can be run on a multi-color flexo web press. The first print unit can apply an overall toner-receptive coating, the film lamination can be kiss die cut in line with a flexible steel rule die. The steel rule die and liner perforation wheels can be positioned in registration to the adhesive pattern. The face stock matrix can be stripped from the top side of the web roll with a rewind shaft.

The web roll can be chop-cut in registration to the die cut every 12" (30.48 cm) to produce a label sheet with dimensions 13" (33.02 cm)×12" (30.48 cm). The label sheet can be four-color printed on a digital press. The four-color labels can be printed in sequential order to match the planogram of a selected store. The print pattern can be in registration to the die cut, which in turn can be in registration to the adhesive pattern and the perforated release liner.

The label sheet can be chop-cut produce three strips of labels, each with dimensions 4.33" (11.00 cm)×12" (30.48 cm). The strips of price labels can be stacked in an order matching the sequence of price labels according to the store planograin.

The polyester face stock can overlap the release liner along at least a portion of, if not the entire, bottom edge of the 12-inch (30.48 cm) strip of labels, for example with an overlap width of 0.1625" (0.41275 cm).

A method for manufacturing the labels is described below in reference to FIG. 6.

Figure 2:
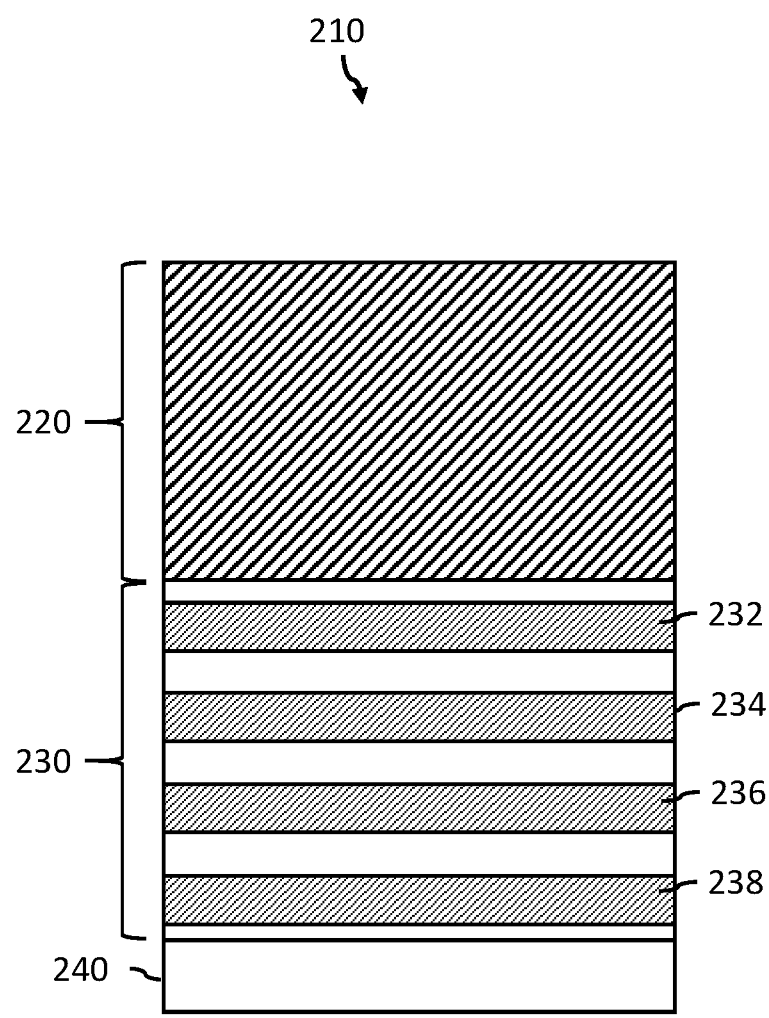
FIG. 2 is a plan view of a label according to a first illustrated embodiment.

FIG. 2 is a plan view of label 210 according to a first embodiment. Label 210 comprises three sections, label head 220, label body 230, and label tab 240.

Label head 220 has adhesive on its back. Label head 220 is intended to be adhered to a shelf edge. In some embodiments, label head 220 can have a solid strip of adhesive 0.5" (1.27 cm) wide.

Label body 230 is shaded according to an example pattern-coating of adhesive, the pattern comprising four equally-spaced strips of adhesive (232, 243, 236, and 238), each strip 0.063" (0.16 cm) wide. The pattern-coated adhesive is on the back of label body 230, adjacent to the release liner (not shown in FIG. 2).

Label body 230 is intended to hang below the shelf edge. Adhesive on the back of label body 230 is intended to adhere label body to a release liner (not shown in FIG. 2).

In at least some embodiments, label tab 240 is adhesive-free on the back, and is intended as a tab to facilitate easy removal of label 210 from the release liner.

In an example embodiment, label head 220 is approximately 1" (2.54 cm) high, label body 230 is approximately 2" (5.08 cm) high, and label tab 240 is approximately 0.125" (0.3175 cm) high.

In some embodiments, three or more rows of labels 210 can be desired on one sheet (see FIG. 1). In these circumstance the label tabs 240 of labels 210 in the center of the sheet will not extend beyond the edge of the release liner. To ease the removal of these labels 210, label tabs 240 can be kiss cut. In some embodiments, label tabs 240 are kiss cut approximately 0.25" (0.635 cm) from a thin strip of patterned adhesive such as 232, 234, 236, or 238 on the backside of label 210. In embodiments, where the label tabs 240 of the center row(s) of labels 210 are kiss cut, labels 210 in the center row can be removed by bending the sheet of labels in the center. This causes the bottom edge of the center labels to pop off the release liner and extend outward 0.25" (0.635 cm). A user can then grab the label tab 240 and pull label 210 off release liner.

Figure 3:
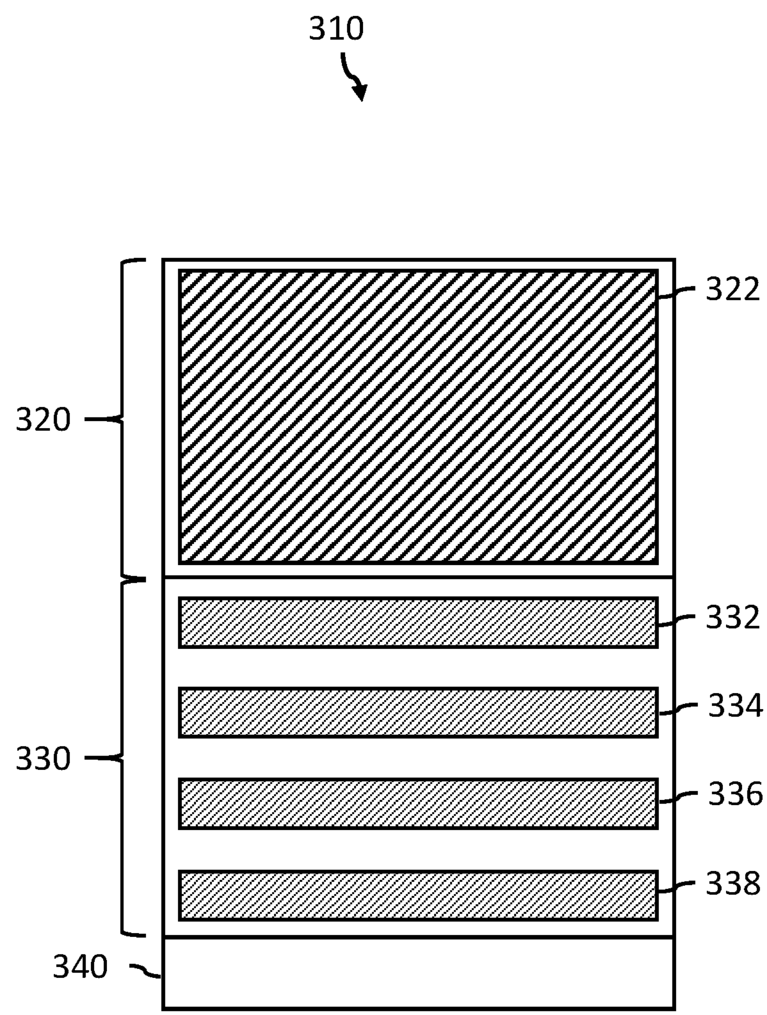
FIG. 3 is a plan view of a label according to a second illustrated embodiment.

FIG. 3 is a plan view of label 310 according to a second embodiment. Label 310 comprises label head 320. Label head 320 is shaded to indicate the pattern-coating of adhesive. In the example shown, the pattern-coating of label 310 comprises an adhesive pattern that does not extend to edge of label.

Label body 330 comprises four approximately equally-spaced strips of low-tack adhesive (332, 334, 336, and 338). Label tab 340 is adhesive-free.

Figure 4:
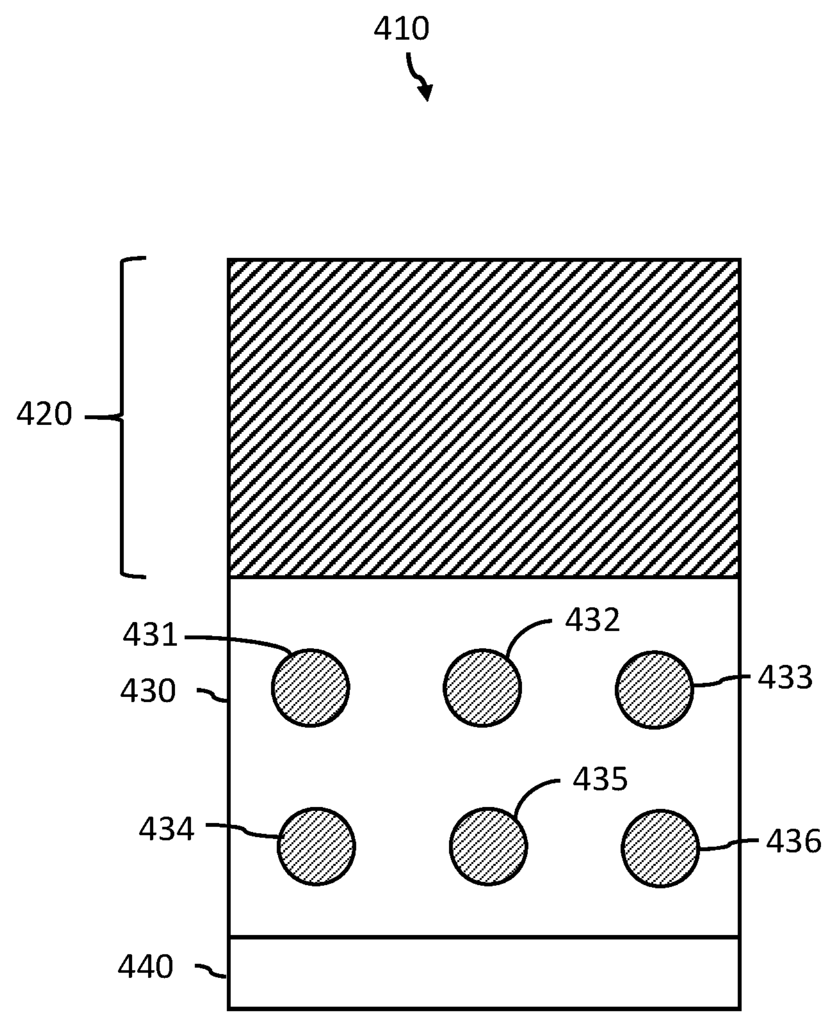
FIG. 4 is a plan view of a label according to a third illustrated embodiment.

FIG. 4 is a plan view of label 410 according to a third embodiment. Label head 420 comprises a solid strip of high-tack adhesive. Label body 430 comprises a pattern coating of six roughly circularly regions of low-tack adhesive 431, 432, 433, 434, 435, and 436. Label tab 440 is adhesive-free.

In some applications it is desirable to have wider strips of patterned adhesive on the back side of the labels, or on the release paper. However, these wide strips of adhesive have a tendency to grab onto products as they are removed from retail shelfs. For these situations the label can be designed such that some adhesive adheres to the label head and the remainder of the adhesive adheres to the release paper (and not the label body). To achieve this result, a silicone coating can be pattern applied to the release liner and a silicone coating can be pattern applied to the backside of the face stock or to the label body or tab in some embodiments. By registering the pattern of the release paper with the pattern on the backside of the face stock. The adhesive can be designed to stay with the face stock or with the release paper.

One advantage of using a patterned adhesive with a patterned silicone coating, is the process involves less steps and material than producing conventional deadened labels.

With a patterned adhesive/silicone process, unlike conventional deadening processes, all the manufacturing steps can be done inline on a single flexo press. This process eliminates the need for additional equipment and operations. Furthermore, as the adhesive/silicone is applied in a pattern, less material is needed. In some embodiments, the adhesive/silicone is applied to less than 20% of the label. Labels manufactured via conventional deadening approaches have adhesive applied to 100% of the label before a UV deadening coat is applied. The overall production costs for a label produced by the method described above are over 30% less compared to one produced using a traditional deadening processes.

In one example, the label is 2"×4". The label head (which is configured to stick to a shelf edge) is 0.5" wide and is the only part of the label that is covered with an adhesive.

One example method of achieving this type of label on a flexo graphic web press is laid out below:

a. a 0.5" (1.27 cm) stripe of silicone release coating is printed along the top edge of a web of paper;

b. a 3" (7.62) stripe of silicone release coating is printed 0.5" (1.27 cm) from the top edge of a web of polyester face stock;

c. a stripe of hot melt adhesive 3.5" (8.89 cm) wide is applied on the top edge of the paper;

d. the polyester face stock is laminated to the paper/adhesive web;

e. the top edge of the paper is registered to the top edge of the polyester;

f. a 2" (5.08 cm)×4" (10.16 cm) shape is kiss cut out of the web laminate (the die cut is registered to the top edge of the web roll).

The finished label has an easy to separate flap 0.5" (1.27 cm) wide at the foot of the label. One can pull the face stock from the release liner which has a 3" (7.62 cm) stripe of adhesive 0.5" (1.27 cm) from the top edge of the liner. The back side of the face stock has a 0.5" (1.27 cm) wide strip of adhesive at head of label that can be applied to the shelf edge.

Figure 5:
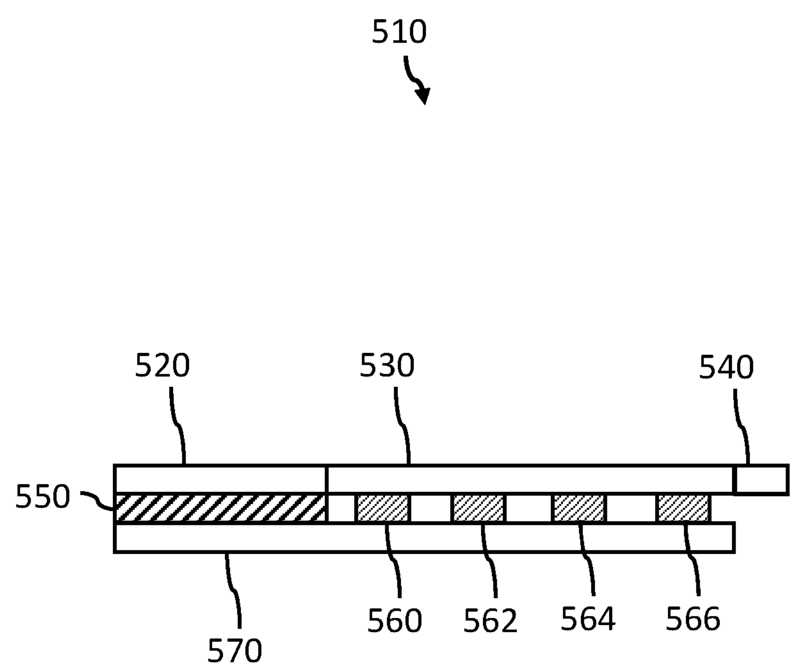
FIG. 5 is a side view of a label such as the labels of FIGS. 2, 3, and/or 4.

FIG. 5 is a side view of label 510 such as one of labels 210, 310, or 410 of FIGS. 2, 3, 4 or similar embodiments respectively. Label 510 comprises label head 520, label body 530, and label tab 540. Label 510 further comprises adhesive 550, 560, 562, 564, and 566, and release liner 570.

In the example shown, label head 520 and label body 530 are attached to release liner 570 via full-coverage adhesive and patterned adhesive 560, 562, 564, and 566, respectively. Label tab 540 is not attached to release liner 570.

Figure 6:
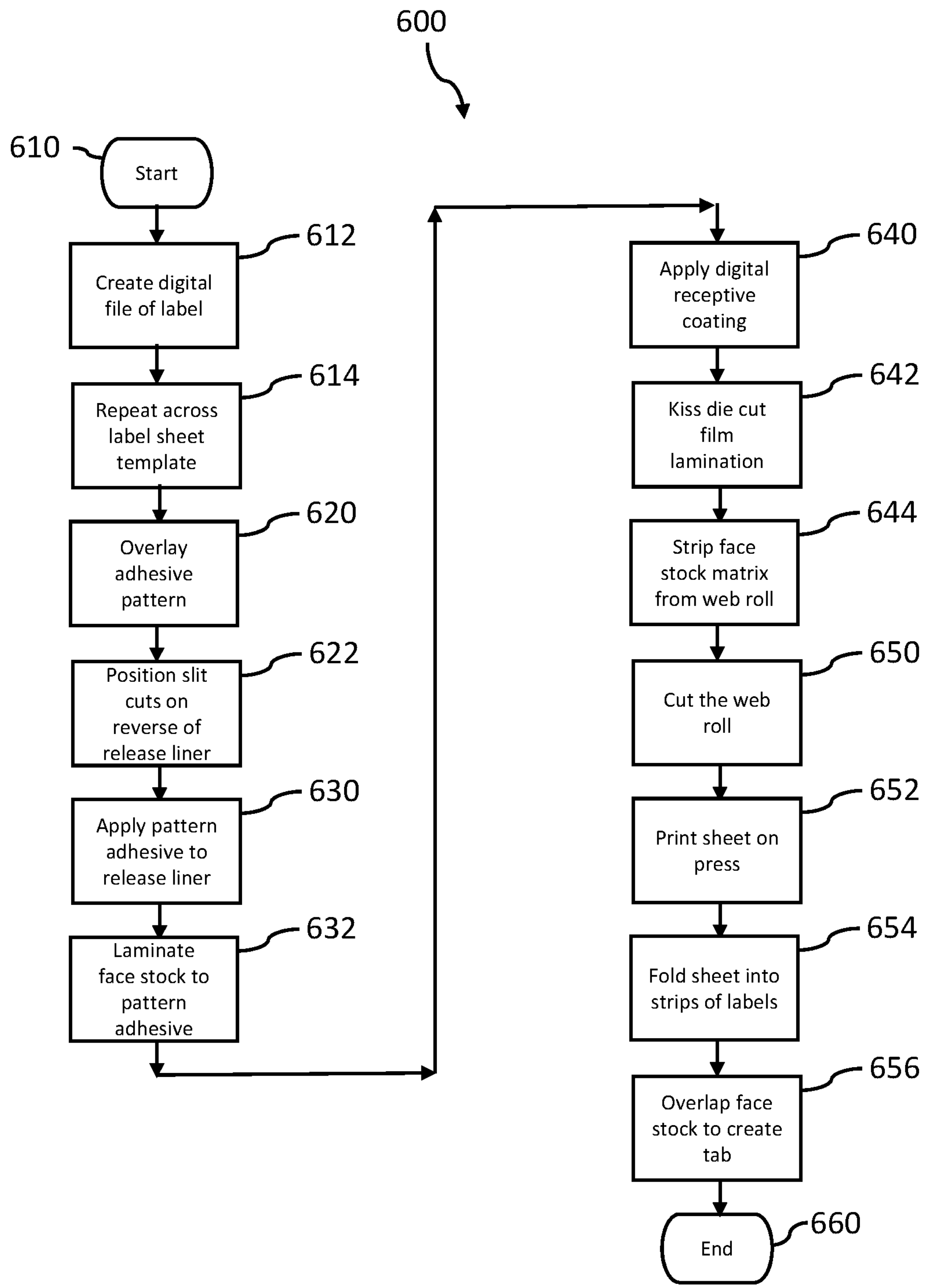
FIG. 6 is a flow chart illustrating an example method for manufacturing shelf edge labels.

FIG. 6 is a flow chart illustrating an example method 600 for manufacturing shelf edge labels in accordance with the technology described in this disclosure. Method 600 starts at 610.

At 612, a digital file is created of a label, and, at 614, the label is repeated across a larger template to create a die cut pattern. At 620, a digital adhesive pattern is overlaid on the die cut pattern. The adhesive pattern can be a suitable arrangement of a combination of low-tack and/or high-tack adhesive. In some embodiments, a digital release coating pattern is overlaid on the die cut pattern as well. At 622, a digital template is created to position one or more perforated cuts on the reverse side of the release liner to create an overhang tab. In some embodiments, a digital template of a release coating is applied to the back of the label.

At 630, a release liner is pattern-coated according to the adhesive pattern template. At 632, the pattern-coated release liner is laminated, for example with a polyester film.

At 640, the web roll is printed with colors and/or an overall digital receptive coating. At 642, the film lamination is kiss die cut in line with a flexible steel rule die, the steel rule die and liner perforating wheels positioned in registration to the adhesive pattern. At 643 the liner is perforated. At 644, the face stock matrix is stripped from the top side of the web roll with a rewind shaft. In some embodiments, such as when using a direct thermal roll or fan fold, a bottom section of some dimension, such as 0.25 inches, of the release liner would also be stripped.

At 650, the web roll is chop-cut in registration to the die cut to generate a sheet, and, at 652, the sheet is printed on a press. In some embodiments, the press is a digital variable data press. At 654, the sheet is folded along the perforations into strips of labels, the labels stacked in an order matching the sequence of price labels according to the store planogram. At 656, the face stock is overlapped with the release liner along the bottom edge of the labels to create a tab. At 660, method 600 ends.

FIG. 6 illustrates an example manufacturing method 600. Variations of method 600 of FIG. 6, and other suitable methods, can be used. For example, in a variation of method 600 of FIG. 6, the web roll can be rewound instead of cut into individual label sheets. The roll can then be digitally printed in registration to the die cut.

Figure 7:
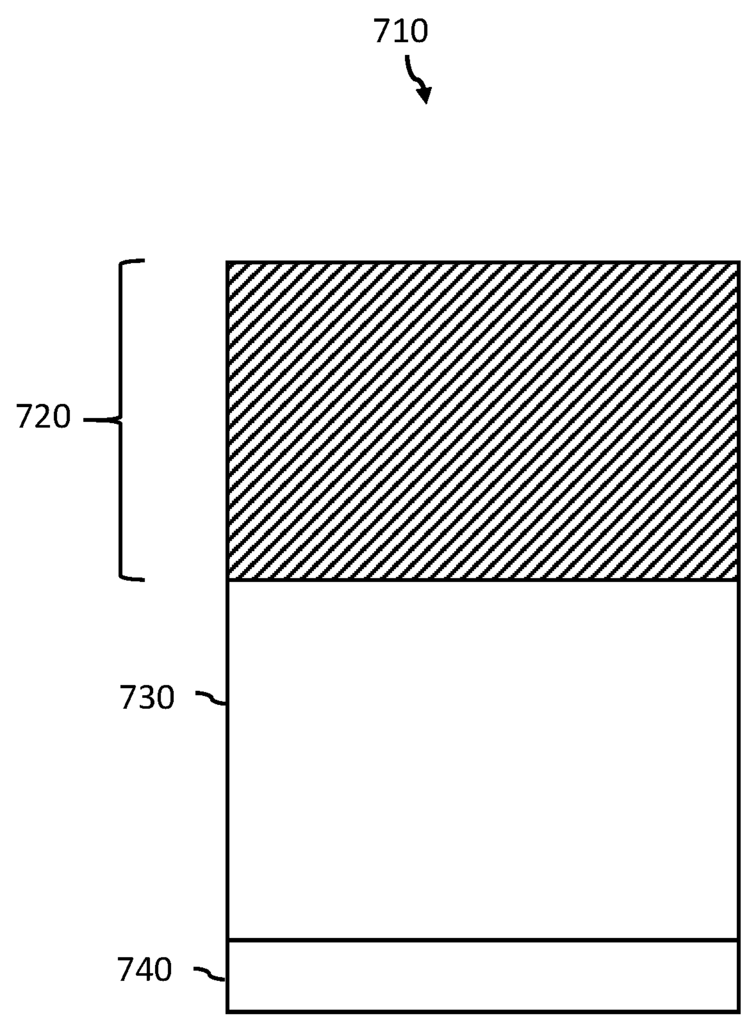
FIG. 7 is a plan view of a label according to a fourth illustrated embodiment.

FIG. 7 illustrates a plan view of label 710 according to an embodiment. Label 710 comprises three sections, label head 720, label body 730, and label tab 740.

Label head 720 has adhesive on its back. Label head 720 is intended to be adhered to a shelf edge. In some embodiments, label head 720 can have a solid strip of adhesive 0.5" (1.27 cm) wide.

Label body 730 is free of any adhesives in some embodiments. In some embodiments, label body 730 is held to a release liner (not shown in FIG. 7) by adhesives applied to the release liner. In some embodiments, the adhesives can be patterned on the release liner. In some embodiments, label body 730 can be coated with a silicone or similar coatings to aid in the removal of label 710 from the release liner. In some embodiments, the silicone coating can be applied in a pattern. In some embodiments, the pattern corresponds to the pattern of the adhesives on the release liner.

In some embodiments, label body 730 is intended to hang below a shelf edge.

In some embodiments, label tab 740 is adhesive-free on the back, and is intended as a tab to facilitate the removal of label 710 from the release liner.

In an example embodiment, label head 720 is approximately 1" (2.54 cm) high, label body 730 is approximately 2" (5.08 cm) high, and/or label tab 240 is approximately 0.125" (0.3175 cm) high.

Figure 9:
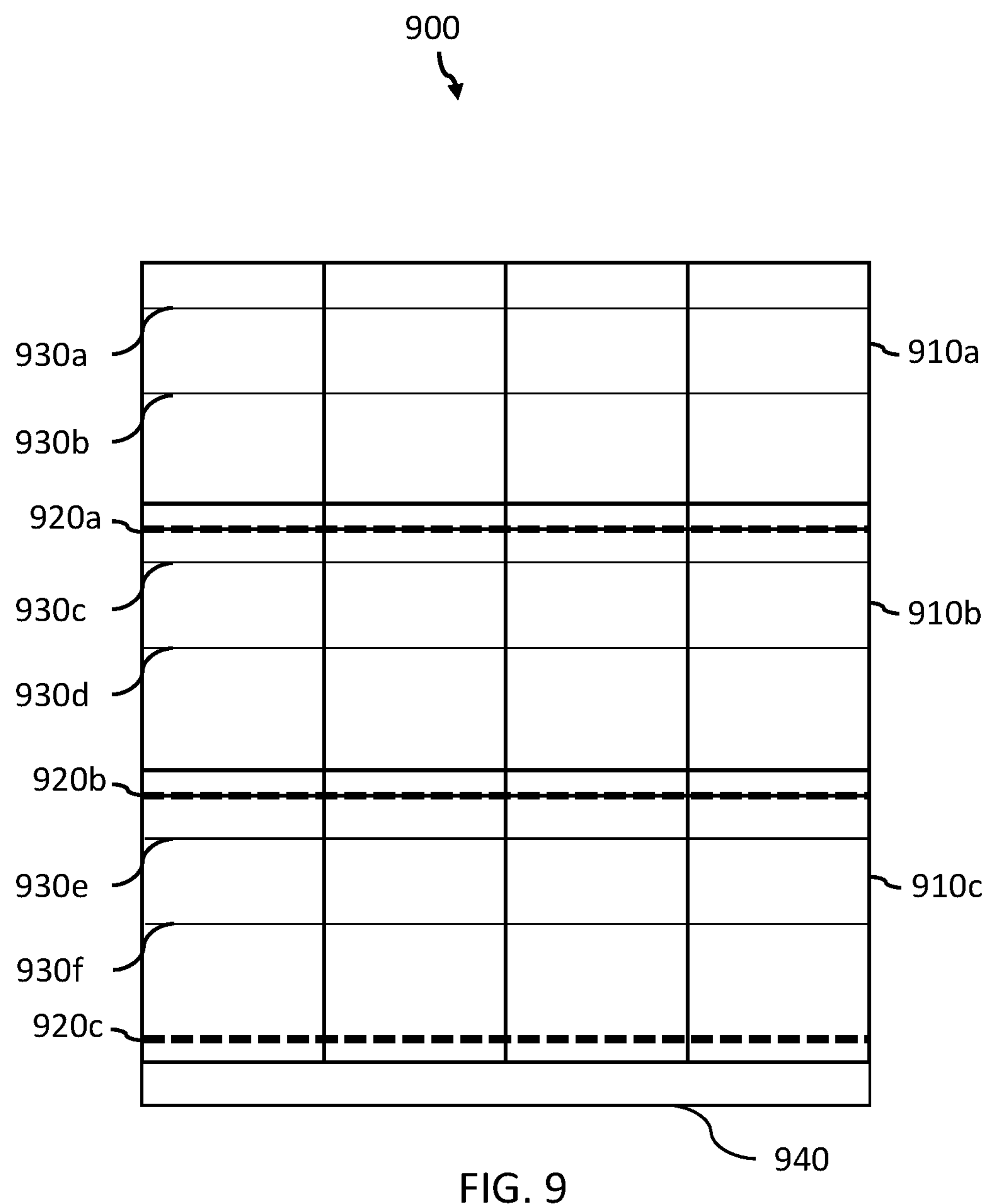
FIG.9 is a plan view of a label sheet according to an illustrated embodiment.

In some embodiments, three or more rows of labels 710 can be desired on one sheet (see FIG. 9). In these circumstances label tabs 740 of labels 710 at the bottom of the sheet will not extend beyond the edge of the release liner. To ease the removal of these labels 710, the release liner is extended beyond the face stock providing a handle to simplify the folding of the liner along the perforation. Once folded all of the labels on the sheet have a pull tab at the foot of the label.

Figure 8:
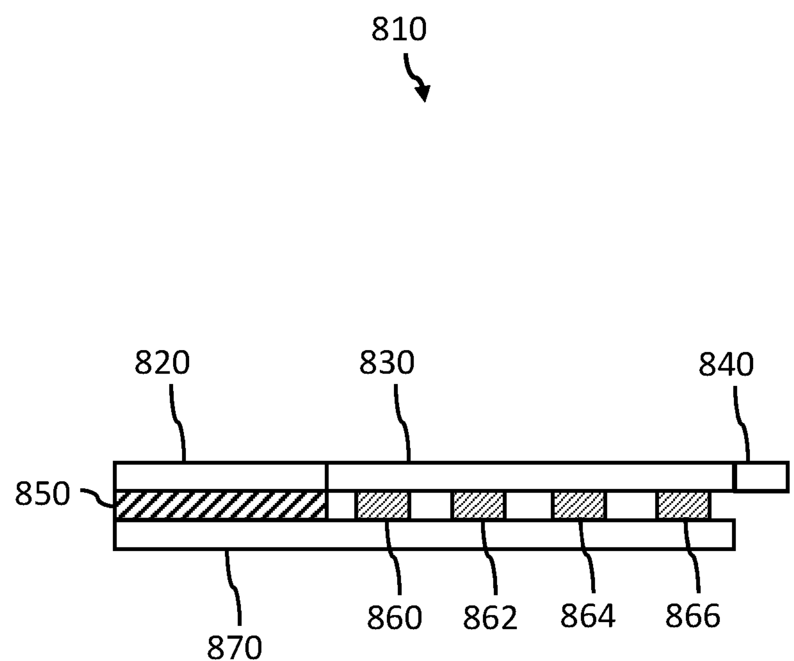
FIG. 8 is a side view of a label such as the label of FIG. 7.

FIG. 8 is a side view of label sheet 810 comprising a label such as label 710 of FIG. 7. Label sheet 810 comprises label head 820, label body 830, label tab 840, and full-coverage adhesive 850, as well as patterned adhesive 860, 862, 864, and 866, and release liner 870. In some embodiments, such as the one shown in FIG. 8, label tab 840 is not attached to release liner 870.

In some embodiments, label body 830 is removably attached to release liner 870 by patterned adhesive 860, 862, 864, and 866. In some embodiments, patterned adhesives are printed on release liner 870. In other embodiments, patterned adhesives are printed on label body 820. In yet other embodiments, patterned adhesives are printed on label body 820 and release liner 870.

In some embodiments, a patterned silicone coat (not shown) can be used in conjunction with the patterned adhesive and/or the full-coverage adhesive 850. In some embodiments, a silicone coat is applied to the entire release liner. In some embodiments, a silicone coat is applied to the section of the release liner corresponding with label head 820.

In embodiments, in which the patterned adhesives are printed on the release linear 870, a corresponding patterned silicone coat can be applied to label body 830. In embodiments, in which the patterned adhesives are printed on label body 830, a corresponding patterned silicone coat can be applied to release linear 870.

FIG. 9 is a plan view label sheet 900 according to an example illustrated embodiment. In the example shown, label sheet comprises 12 individual labels 910 such as labels 910*a*, 910*b*, and 910*c*. In other embodiments, label sheet 900 can comprise a single label 910 or other suitable numbers of labels 910.

In some embodiments, the label template for each label 910 on label sheet 900 is the same and is repeated across the label sheet. In other embodiments, the label template can result in labels of various sizes and/or shapes on a single sheet. In the example illustrated in FIG. 9, labels 910*a*, 910*b*, and 910*c* follow a repeating template.

The label sheet shown in FIG. 9 also comprises patterned adhesives 930 and perforations 920. In FIG. 9 and associated embodiments, patterned adhesives 930 are printed on label sheet 910. Perforations 920 can be torn to divide label sheets. In some embodiments, label sheet can be folded along perforations 920 to make label tabs such as tab 740 in FIG. 7 more accessible.

A digital template can be created to position perforations 920 (such as perforations 920*a*, 920*b*, 920*c* and 920*d*) on the reverse side of the release liner. These perforations can be in registration to the die cut pattern of the labels, and undercut the bottom edge of each label, for example by 0.125" (0.3175 cm).

A digital adhesive pattern can be overlaid on the original die cut pattern. In an example embodiment, the adhesive pattern template can comprise a 0.5-inch (1.27 cm) solid adhesive strip at the head of the label. A digital adhesive pattern can also be overlaid on the release liner as shown in FIG. 9 with patterned adhesives 930 (comprising 930*a*, 930*b*, 930*c*, 930*d*, 930*e*, and 930*f*).

In some embodiments, the release liner is extended beyond the face stock providing a handle to simplify the folding of the liner along the perforation, such as at 940.

Figure 10:
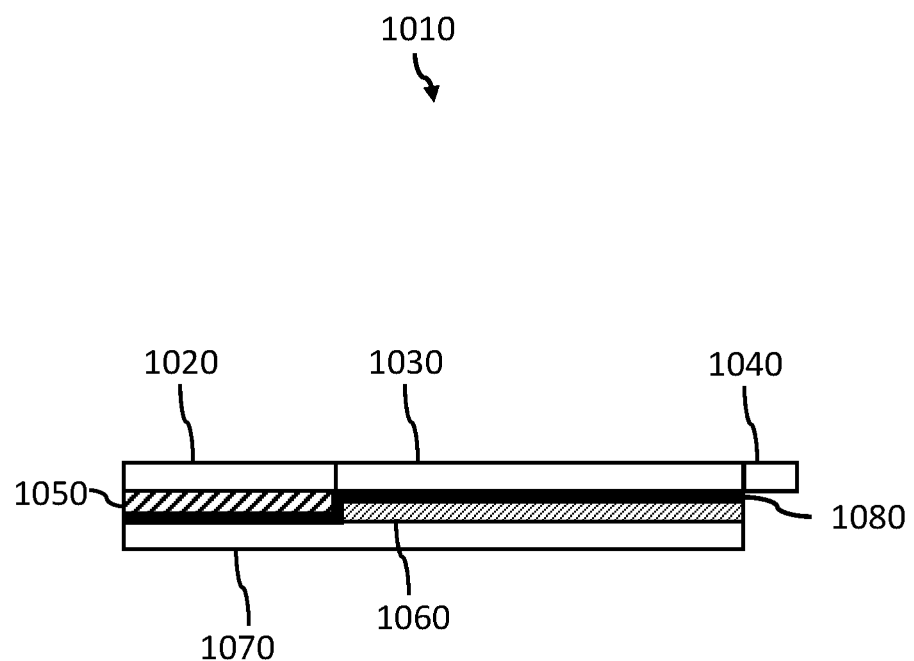
FIG. 10 is a side view of a label sheet.

FIG. 10 is a side view of label sheet 1010 comprising a label such as label 710 of FIG. 7. Label sheet 1010 comprises label head 1020, label body 1030, label tab 1040, and full-coverage adhesive 1050, as well as patterned adhesive 1060, and release liner 1070. In some embodiments, such as the one shown in FIG. 10, label tab 1040 is not attached to release liner 1070. Label sheet 1010 further comprises silicone release pattern 1080, printed on the bottom side of the label assembly and the top side of the release liner.

Figure 11A:
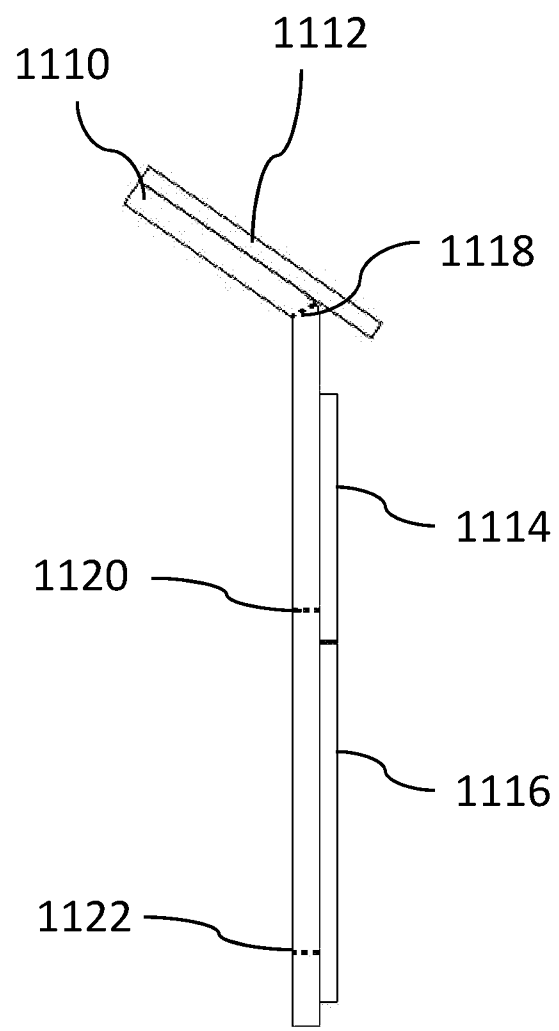
FIG. 11A is a side view of a label sheet.

FIG. 11A is a side view of a label sheet, having release liner 1110, first label 1112, second label 1114, third label 1116, and perforations 1118, 1120, and 1122.

Figure 11B:
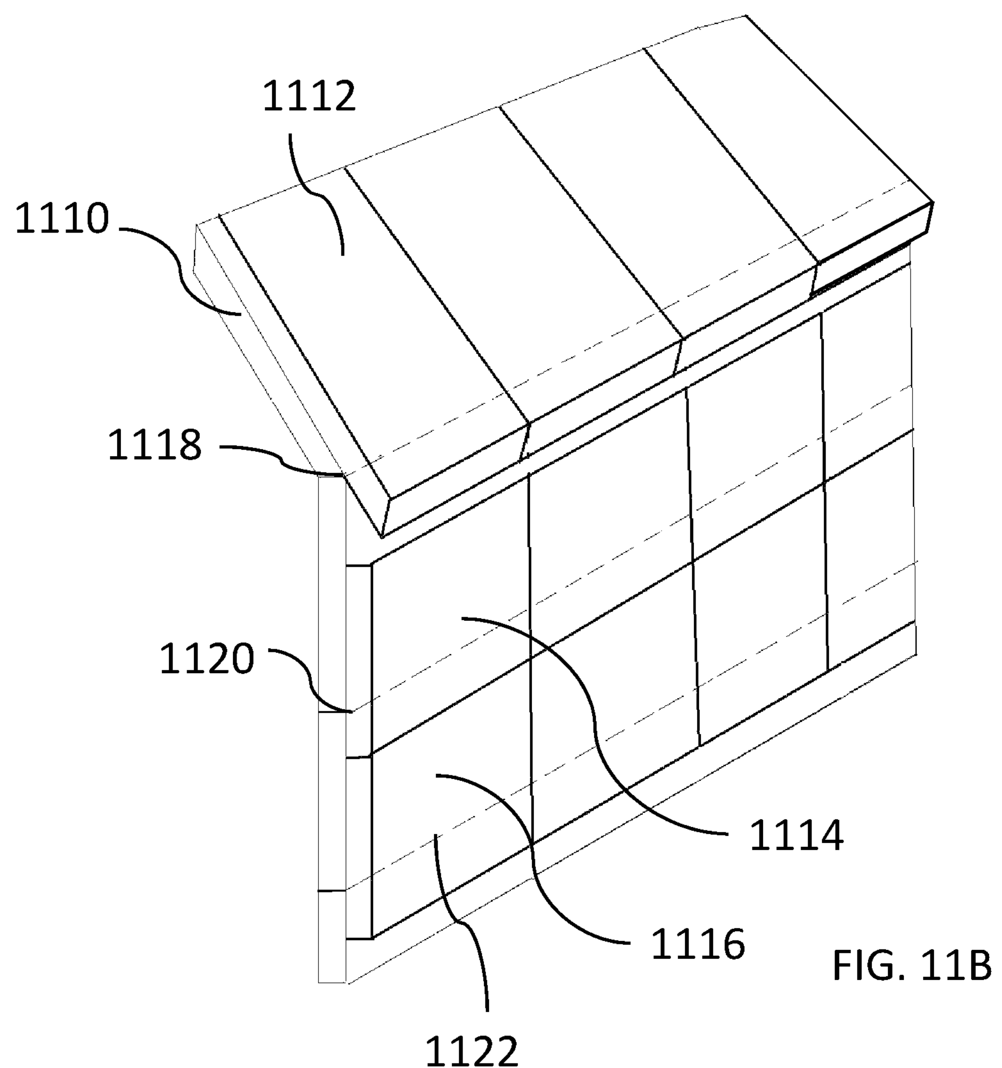
FIG. 11B is a perspective view of a label sheet.

FIG. 11B is a perspective view of the label sheet depicted in FIG. 11A, showing how the perforations in label sheet 1110 combined with the label placement on release liner 1110 allow a user to fold or tear along perforations in the release liner to more easily remove labels.

Figure 12:
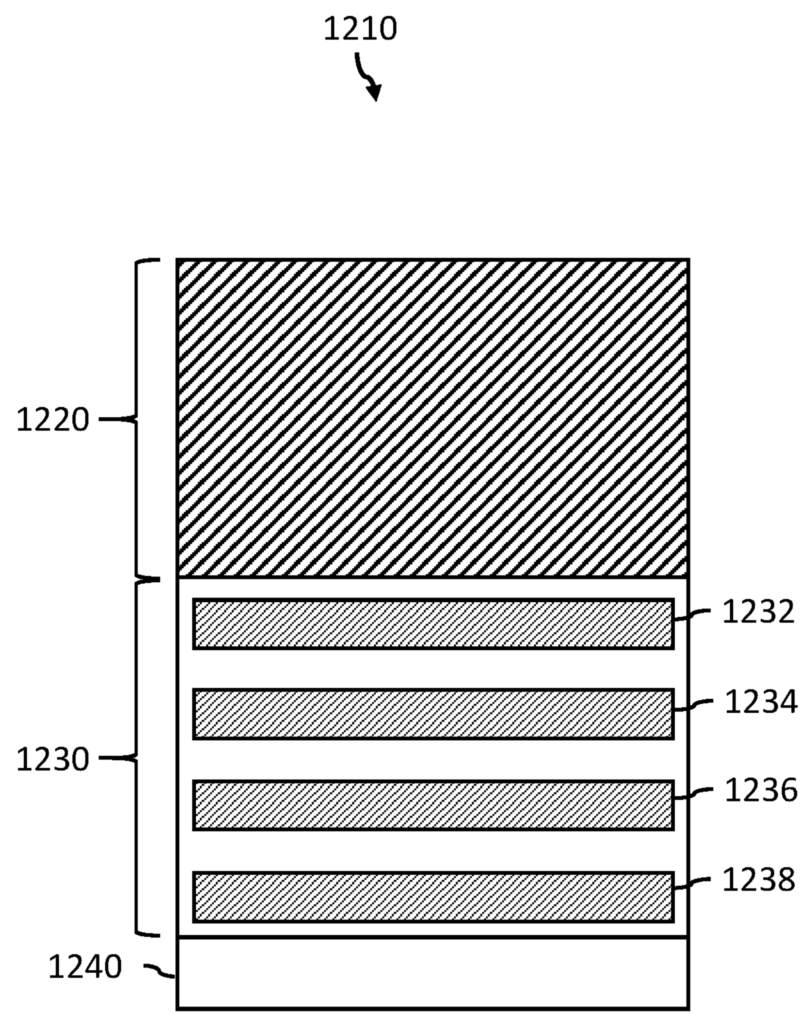
FIG. 12 is a plan view of a label.

FIG. 12 is a plan view of label 1210 according to an embodiment. Label 1210 comprises three sections, label head 1220, label body 1230, and label tab 1240.

Label head 1220 has adhesive on its back. Label head 1220 is intended to be adhered to a shelf edge. In some embodiments, label head 1220 can have a solid strip of adhesive 0.5" (1.27 cm) wide.

Label body 1230 is shaded according to an example pattern-coating of adhesive, the pattern comprising four equally-spaced strips of adhesive (1232, 1243, 1236, and 1238), each strip 0.063" (0.16 cm) wide. The pattern-coated adhesive is on the back of label body 1230, adjacent to the release liner (not shown in FIG. 12).

Figure 13:
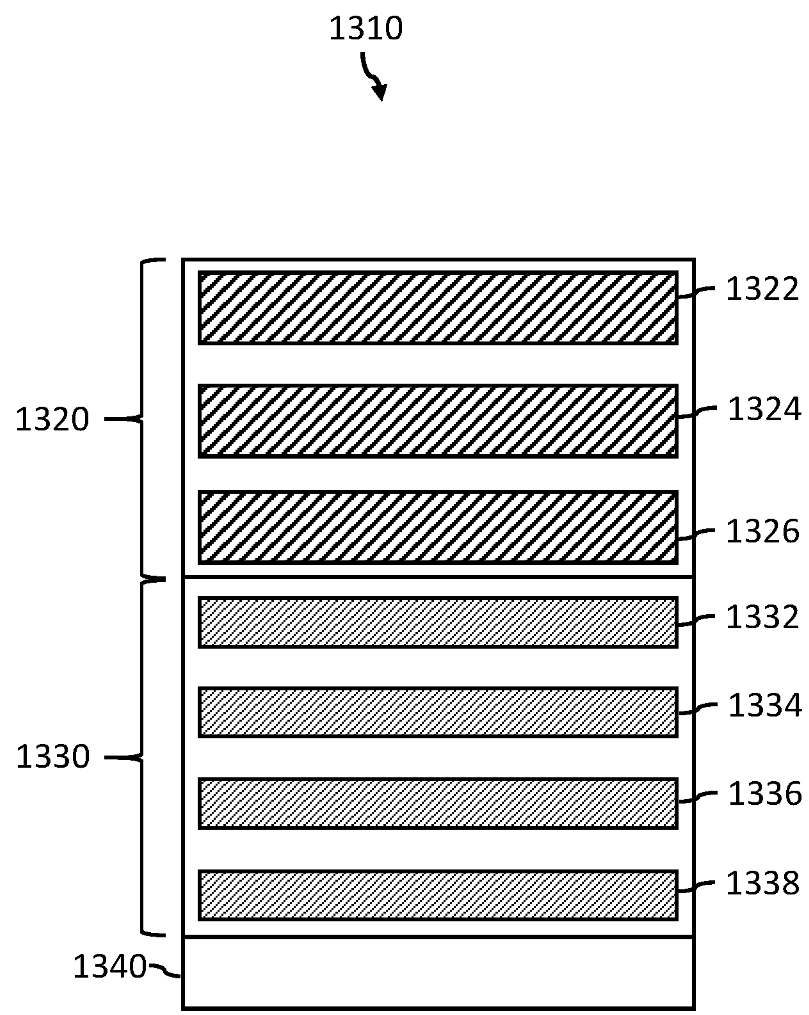
FIG. 13 is a plan view of a label.

FIG. 13 is a plan view of label 1310 according to an embodiment. Label 1310 comprises label head 1320. Label head 1320 is shaded to indicate the pattern-coating of adhesive. In the example shown, the pattern-coating of label 1310 comprises an adhesive pattern that does not extend to edge of label, and the pattern coating of label head 1320 comprises four approximately equally spaced strips of low-tack adhesive (1322, 1324, 1326).

Label body 1330 comprises four approximately equally-spaced strips of low-tack adhesive (1332, 1334, 1336, and 1338). Label tab 1340 is adhesive-free.

In some variations of the manufacturing process, the rolls are fan-folded with perforations at regular intervals, for example every 12" (30.48 cm). The fan-folded roll can be separated into different retail departments by tearing sections of the fan-folds along the perforations.

In yet another variation, the labels are designed for direct thermal printing. For example, a white cavitated polypropylene film 2 mils thick can be substituted for the polyester film. The polypropylene can be flexographic flood-coated on three units with a direct thermal coating. The fan-folded direct thermal film can be one-color printed on a direct thermal printer.

Alternatively, the polypropylene film face stock described above can be substituted by paper board.

In another alternative, the hot melt adhesive can be applied in-line on a narrow web press, as described below for a particular manufacturing example.

On the first unit of a narrow web press, a 13-inch (33.02 cm) width web of 70 lb paper liner is flood-coated with a UV Silicone release coat. The silicone release liner is then pattern coated with a narrow web hot melt slot die coater. The slot blade on the hot melt extrusion die is cut to match the adhesive pattern template.

Hot melt pressure-sensitive adhesive is extruded through the pattern cut slot die at a 0.75 mil coat weight. The pattern-coated release liner is then laminated to a corona treated white 2 mil polyester film creating a roll of pressure-sensitive film.

The laminated roll is then coated with an overall toner receptive clear coating. The film lamination is kiss die cut in line with a flexible steel rule die. The steel rule die and liner slit wheels is positioned in registration to the adhesive pattern. The release liner matrix is stripped from the bottom side of the web roll with a rewind shaft.

The web roll is chop-cut in registration to the die cut, for example every 12" (30.48 cm) outputting a 13-inch (33.02 cm)×12-inch (30.48 cm) sheet. The sheet is then four-color printed on a digital press. The four color labels can be printed in sequential order to match a stores planogram.

In another embodiment, a patterned adhesive shelf edge label can be manufactured without a release liner. The approach can be suitable for use with direct thermal printers. The adhesive pattern is in registration to the shape of the label, and the label is not cut completely through. Instead, a perforation rule is used to separate the individual labels.

On the first unit of a narrow web press, a 13-inch (33.02 cm) width web of 224 gauge white cavitated polypropylene film is printed with a registration mark. The mark is used by the direct thermal printer to register the thermal print pattern with the die cut pattern. The film is then pattern-coated with a hot melt slot die coater. The slot blade on the hot melt extrusion die is cut to match the adhesive pattern template.

Hot melt pressure sensitive adhesive is extruded through the pattern cut slot die at a 0.75 mil coat weight. The web roll is then flipped with a turn bar and flood-coated on the next three flexo units with direct thermal coating. The direct thermal coating is over printed on the final flexo unit with a flood coat of UV silicone coating.

The polypropylene film is then die cut in registration with the adhesive pattern. The die rule is replaced with a micro perforating rule of 30 perf/inch. The web rolls are slit into 3-inch (7.62 cm) web rolls and wound upon themselves. The silicone top coat protects the thermal coating from being removed by the adhesive when unwound.

The film is then printed on a direct thermal printer and rewound. The length of the roll is determined by the number of labels printed per store. The label is removed from the roll by grabbing the bottom portion of the label which has no adhesive and tearing along the micro perforation.

A variation of the process described above uses a UV-cured pressure-sensitive adhesive instead of the hot melt adhesive. The adhesive can be pattern-coated using a flexographic printing plate. The flexo plate enables the non-tack portion of the shelf edge label to be printed in a wide variety of patterns.

The above described embodiments can be used individually or in various suitable combinations. Listed steps can be excluded or additional steps added without departing from the scope of the present disclosure.

While particular elements, embodiments and applications of the present invention have been shown and described, it will be understood, that the invention is not limited thereto since modifications can be made without departing from the scope of the present disclosure, particularly in light of the foregoing teachings.

What is claimed is:

1. A pattern-adhesive label-sheet comprising:
(a) at least one label made of a face stock comprising:
(i) a label head with a first adhesive applied in a first pattern to said label head;
(ii)a label body with a second adhesive applied in a second pattern; and
(iii) an adhesive-free label tab; and
(b) a release liner, wherein at least part of said label tab overhangs a perforation of said release liner such that when said release liner is folded along said perforation said label tab can be readily pulled to remove said label from said release liner,
wherein said first adhesive is a high-tack adhesive and said second adhesive is a low-tack adhesive.

2. The pattern-adhesive label-sheet of claim 1 wherein said first adhesive is configured to work in temperatures between −30 degrees Celsius to 40 degrees Celsius.

3. The pattern-adhesive label-sheet of claim 1 wherein said label-sheet is part of a roll.

4. The pattern-adhesive label-sheet of claim 1 wherein said first adhesive is selected from the group consisting of an acrylic microsphere adhesive, an UV adhesive, and a hot melt adhesive.

5. The pattern-adhesive label-sheet of claim 1 wherein said second pattern is selected from the group consisting of a series of dots, a series of dashes, and a series of lines that run across essentially the entire width of the release liner.

6. The pattern-adhesive label-sheet of claim 1 wherein said release liner is selected from the group consisting of paper and a synthetic material.

7. The pattern-adhesive label-sheet of claim 1 wherein said face stock is selected from the group consisting of paper and a synthetic material.

8. The pattern-adhesive label-sheet if claim 1 wherein said label sheet is configured to be used with a direct thermal printer.

9. The pattern-adhesive label-sheet of claim 1 wherein said first pattern and said second pattern are configured in such a way that said first adhesive and said second adhesive do not ooze when said label-sheet is printed on.

10. The pattern-adhesive label-sheet of claim 1 wherein said release liner is coated with a silicone-coating.

11. The pattern-adhesive label-sheet of claim 1 wherein said first adhesive pattern and said second adhesive pattern cover less than 20% of said label.

12. The pattern-adhesive label-sheet of claim 1 wherein said second pattern is a series of lines that run across essentially the entire width of said label body.

13. The pattern-adhesive label-sheet of claim 1 wherein said second pattern is further applied to said release liner.

14. The pattern-adhesive label-sheet of claim 1 wherein a silicone coat is applied to said release liner.

15. A pattern-adhesive label-sheet comprising:
(a) at least one label made of a face stock comprising:
(i) a label head with a first adhesive applied in a first pattern to said label head;
(ii) a label body with a second adhesive applied in a second pattern; and
(iii) an adhesive-free label tab; and
(b) a release liner, wherein at least part of said label tab overhangs a perforation of said release liner such that when said release liner is folded along said perforation said label tab can be readily pulled to remove said label from said release liner.

* * * * *